(No Model.)
J. W. CLARK.
CULTIVATOR.
No. 388,832. Patented Sept. 4, 1888.
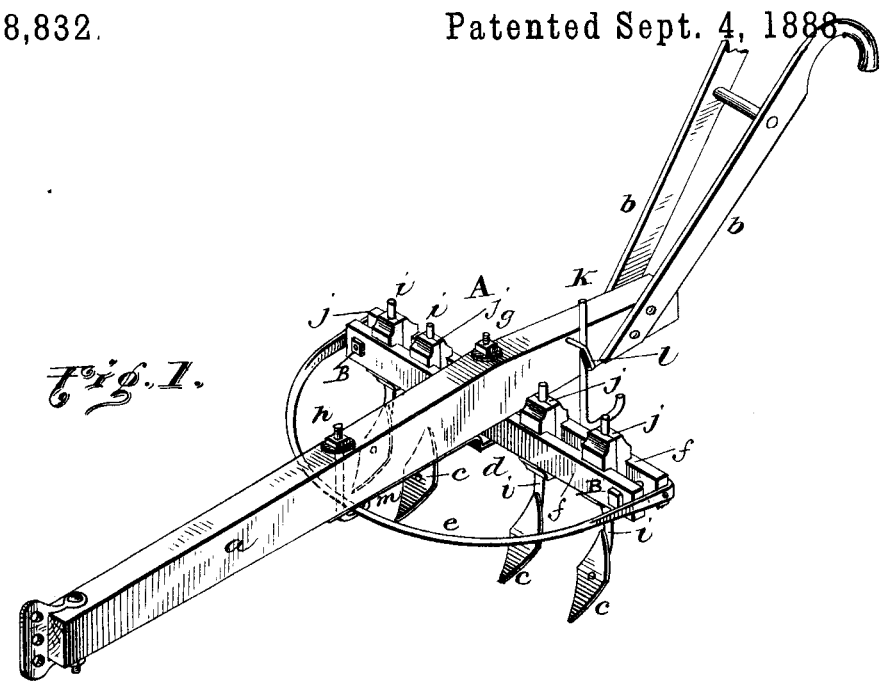
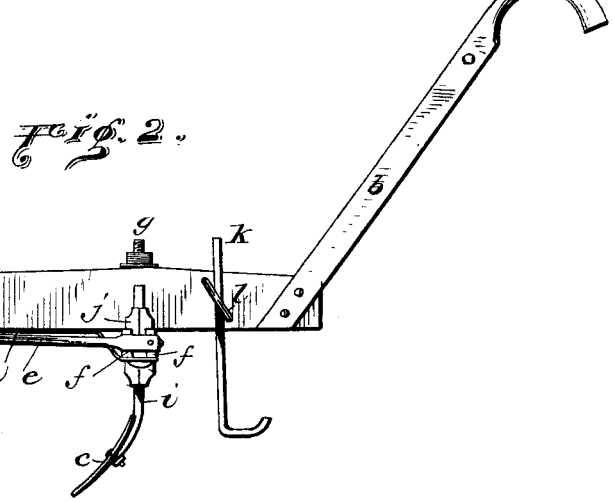
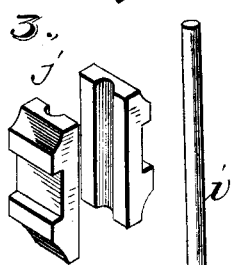
WITNESSES
F. L. Ourand
Thos Watson
INVENTOR
J. W. Clark
by E. H. Bates
Attorney.

UNITED STATES PATENT OFFICE.

JOHN W. CLARK, OF JACKSON, MISSISSIPPI, ASSIGNOR OF ONE-HALF TO LYNN H. KIRKLAND, OF SAME PLACE.

CULTIVATOR.

SPECIFICATION forming part of Letters Patent No. 388,832, dated September 4, 1888.

Application filed May 17, 1888. Serial No. 274,164. (No model.)

*To all whom it may concern:*

Be it known that I, JOHN W. CLARK, a citizen of the United States, residing at Jackson, in the county of Hinds and State of Mississippi, have invented certain new and useful Improvements in Cultivators; and I do hereby declare the following to be a full, clear, and exact description of the invention, such as will enable others skilled in the art to which it appertains to make and use the same.

This invention relates to improvements in cultivators; and it consists in the novel construction and arrangement and combination of parts, as will be hereinafter fully explained.

The annexed drawings, to which reference is made, fully illustrate my invention, in which—

Figure 1 represents a perspective view of my cultivator. Fig. 2 is a side view, and Fig. 3 is a detail view.

Referring by letter to the accompanying drawings, A designates the cultivator, of which $a$ is the beam, $b\ b$ the handles, $c$ the plow-points, and $d$ a pivoted frame composed of a semicircular bar, $e$, and straight bars $f\ f$. The cross-bars $f\ f$ are pivoted at their center to the beam of the cultivator by a bolt, $g$, and the two ends of the semicircular bar are bolted to the outer ends of the cross bars or around outer teeth. This semicircular bar is held tightly in position by an L-shaped bolt, $h$, which passes vertically through the beam, and has a nut at its upper end, whereby the bar can be made fast to the beam.

The shovels $c$ are secured to the lower ends of the standards $i$, which latter are made of round iron or steel, and are connected to two clamps, $j\ j$, arranged between the two bars $f\ f$, which latter bars are held firmly together by bolts B B. Thus it will be seen that the standards with their shovels or points are vertically adjustable, and the same can be raised or lowered at pleasure simply by loosening the said bolts in the cross-bars $f\ f$, which in turn loosen the clamps on the standards and permit the latter to be raised or lowered, after which the nuts on the bolts are again screwed up to hold them in position, thus adapting the shovels to any ground or any work.

It will be observed that when the L-shaped bolt $h$ is loosened the frame can be turned to the right or left, the same swinging on the central bolt, $g$, in the beam, thereby forming a right or left side harrow, and when in its normal position the implement is a cultivator.

In rear of the cultivator-shovels I provide a runner or gage, $k$, which is clamped to the beam by a clamp, $l$, and said runner is made adjustable by loosening the bolts on said clamp and setting it at any height, thereby regulating the depth of the teeth in the ground. The two bolts in the beam are connected by a plate, $m$, which serves as a brace, and in connection with the semicircular bar forms a strong connection of the frame with the beam.

One of the essential features of my combined implement is the vertically adjustable runner $k$, arranged in rear of the gang of vertically-adjustable beams $i$, whereby the depth of run of the shovels can be conveniently regulated.

Having thus described my invention, what I desire to secure by Letters Patent is—

The combined convertible hand cultivator and harrow, comprising the following instrumentalities: a beam, $a$, pivoted cross-bars $f\ f$, the clamping blocks $j$, the circularly and vertically adjustable cylindrical standards $i$, bearing shovels, the arc-bar $e$, rigidly secured to the ends of the rear one of the bars $f$, the hook-bolt $h$, and the vertically-adjustable gage runner $k$, all as shown and described.

In testimony whereof I affix my signature in presence of two witnesses.

JOHN W. CLARK.

Witnesses:
   ROB. J. BOWEN,
   H. L. McGOWEN.